United States Patent [19]

Hilbertz

[11] 4,246,075

[45] Jan. 20, 1981

[54] MINERAL ACCRETION OF LARGE SURFACE STRUCTURES, BUILDING COMPONENTS AND ELEMENTS

[75] Inventor: Wolf H. Hilbertz, Austin, Tex.

[73] Assignee: Marine Resources Company, Austin, Tex.

[21] Appl. No.: 21,844

[22] Filed: Mar. 19, 1979

[51] Int. Cl.³ ............................ C25B 1/00; C25D 9/08
[52] U.S. Cl. .................................... 204/1 R; 204/23; 204/56 R
[58] Field of Search ................... 204/23, 56 R, 145 R, 204/24, 25, 26, 27, 1 R

[56] References Cited

U.S. PATENT DOCUMENTS

| | | | |
|---|---|---|---|
| 2,200,469 | 5/1940 | Cox | 204/26 |
| 2,687,993 | 8/1954 | Cox | 204/145 R |

OTHER PUBLICATIONS

Seagrant Report No. 04-6-158-44111, Dec., 1976.
Industrialization Forum 6 (2) pp. 53-56, 1975.

*Primary Examiner*—T. M. Tufariello
*Attorney, Agent, or Firm*—Arnold, White & Durkee

[57] ABSTRACT

By establishing a direct electrical current between electrodes in an electrolyte like seawater, calcium carbonates, magnesium hydroxides, and hydrogen are precipitated at the cathode, while at the anode, oxygen and chlorine are produced. The electrodeposition of minerals is utilized to construct large surface area (i.e. greater than 100 square feet) structures, building components and elements of a hard, strong material (i.e. 1000-8000 P.S.I. compression strength). To make a large surface area structure, building component or element of hard, strong material, a preshaped form of electrically conductive material is disposed in a volume of electrolyte, such as seawater, to serve as a cathode, one or more are anodes disposed in proximity to the form, and a direct electrical current is established between the electrodes for a period of time sufficient to accrete a solid covering of material on the form.

15 Claims, 8 Drawing Figures

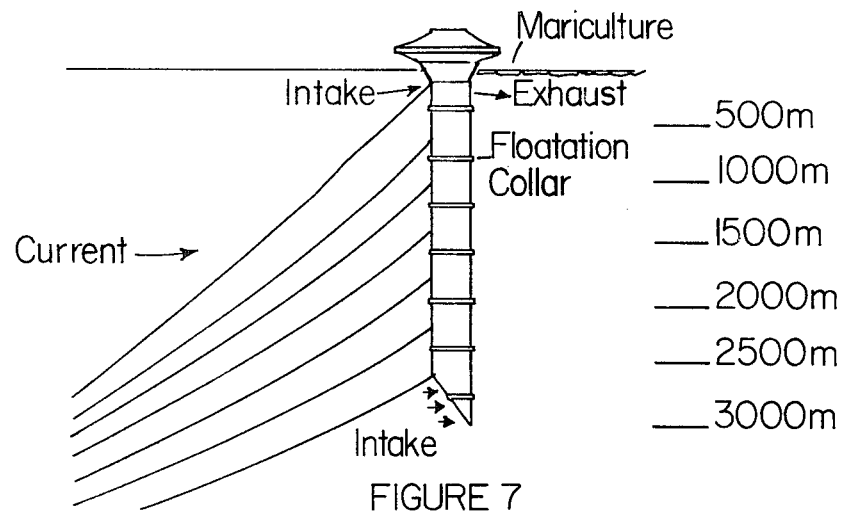
FIGURE 7
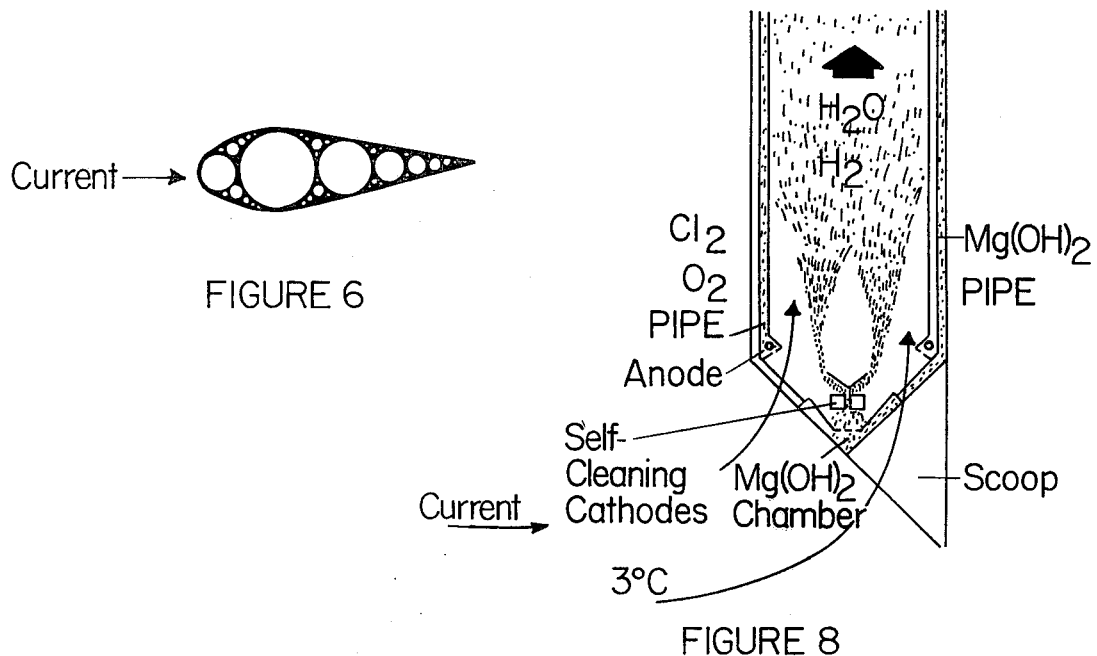
FIGURE 6
FIGURE 8

MINERAL ACCRETION OF LARGE SURFACE STRUCTURES, BUILDING COMPONENTS AND ELEMENTS

BACKGROUND OF THE INVENTION

The present invention relates generally to construction materials and processes; and more particularly, it relates to the electrodeposition of minerals to form a hard, strong material suitable for use as a construction material for large surface area structures, building components, and elements.

Seawater contains nine major elements: sodium, magnesium, calcium, potassium, strontium, chlorine, sulphur, bromine, and carbon. These elements comprise more than 99.9% of the total dissolved salts in the ocean (see Milliman, et al, *Marine Carbonates*, Springer-Verlag, N.Y., 1974; Sverdrup, et al., *The Oceans: Their Physics, Chemistry, and General Biology*, Prentiss-Hall, Inc., in N.J. 1942; and Culkin and Goldberg in Volume 1, *Chemical Oceanography*, pp. 121-196, Academic Press, London 1965). The constancy of the ratios of the major elements throughout the oceans has long been well-known (Dittmar, Challenger Reports, Physics and Chemistry, pp. 1-251, 1884).

In 1940 and 1947, G. C. Cox was issued U.S. Pat. Nos. 2,200,469 and 2,417,064, outlining methods of cathodic cleaning and protection of metallic surfaces submerged in seawater by means of a direct electrical current. During the cleaning process, a coating is also formed cathodically, consisting of magnesium and calcium salts (Eickhoff and Shaw, Corrosion, No. 4, pp. 463-474, 1948). If these coatings are hard and continuous, they afford a considerable degree of corrosion protection to the enclosed metal (see Humble, Corrosion, No. 4, pp. 358-370, 1948, and Corrosion, Volume 4, No. 9, pp. 292-302, 1949).

Lower marine organisms utilize the minerals in solutions surrounding them to build structural formations. Mollusk shells, for example, are generally composed of calcium carbonate crystals enclosed in an organic matrix. A significant proportion of the soluble protein in the matrix is composed of a repeating sequence of aspartic acid separated by either glycine or serine (see Jope in Volume 26, *Comprehensive Biochemistry*, p. 749, Elsevier, Amsterdam, 1971). This sequence, comprising regular repeating negative charges, could bind $Ca^{2+}$ ions and thus perform an important function in mineralization of the template (Weiner and Hood, Volume 190, *Science*, pp. 987-989, 1975).

Although impressed current produced calcium carbonate/magnesium hydroxide formations are known, such formations have never been thought of as a primary construction material for structures, building components and elements.

SUMMARY OF THE INVENTION

In accordance with the present invention, a hard, strong material of high strength (i.e. a compression strength greater than 1000 P.S.I.) suitable for use as a construction material for large surface area (i.e. greater than 100 square feet) structures and building components is made by accretion through the electrodeposition of minerals.

Further in accordance with the present invention, a large surface area structure, building component or element of a hard, strong material of high strength is made by accretion through the electrodeposition of materials on a preformed substrate immersed in a body of electrolyte. Preferably, the electrolyte is seawater, providing a chemical composition for the material which includes mainly brucite, aragonite, and calcite; however, any mineral containing liquid may be used.

Further in accordance with the present invention, a large surface area structure, building component or element of a hard, strong material of high strength is made by disposing a form, which is at least partially of an electrically conductive material and shaped in the configuration desired for the large structure, building component or element in a volume of electrolyte to serve as a cathode, disposing an anode in the electrolyte in proximity to the shaped form, and establishing a direct electrical current between the electrodes. For the accretion of most building components, the electrical current may be of a density of up to 15000 mA/sq.ft. with an electric field potential between the electrodes of up to 30,000 volts.

Finally, in accordance with the present invention, a method for constructing a large surface area structure, building component or element is provided, which comprises the steps of disposing a large surface area preshaped form in a volume of electrolyte, the form serving as a cathode, disposing an anode in the electrolyte in proximity to the preshaped form, and establishing a direct electrical current between the cathode and anode for a time sufficient to accrete a solid covering or filling of structural material on the form.

BRIEF DESCRIPTION OF THE DRAWINGS

A more complete appreciation of the invention may be had by reference to the accompanying drawings, wherein:

FIGS. 6, 7 and 8 are drawings which illustrate the application of mineral accretion technology to the construction of an ocean thermal energy conversion plant (OTEC).

DETAILED DESCRIPTION OF THE INVENTION

A. General Discussion

The oceans hold in solution a great material resource, acting as a link in the continual and vital cycle of material from land to sea. Each year, rivers contribute $2.73 \times 10^9$ metric tons of newly dissolved solids. In the 70.8% of the earth's surface which is covered by water, there are over 60 quadrillion tons of mineral resources (Wenk, E., Jr., "The Physical Resources Of The Ocean," *The Ocean*, W. J. Freeman and Co., 1969).

Apart from oxygen and hydrogen, one cubic mile of seawater contains:

| | |
|---|---|
| chlorine | 89 500 000t |
| sodium | 49 500 000t |

| | |
|---|---|
| -continued | |
| magnesium | 6 125 000t |
| sulphur | 1 880 000t |
| calcium | 1 790 000t |
| potassium | 1 609 000t |
| bromine | 306 000t |
| carbon | 132 000t | and 51 other minerals and elements.

The utilization of processes similar to those exhibited by the structural mechanisms of living organisms and in nonliving environments, such as caverns, provides a mineral accretion technology which involves the deposition and calcification of minerals in solution for structural purposes. That is, through electrolytic processes (diagenesis) and subsequent biological phasing (biogenesis), unstructured materials are electrodeposited onto conductive forms and chemically tranformed by biological organisms into materials with structural capabilities.

The deposition and calcification of minerals in the environment is made possible by the fact that the medium in which they are suspended, water, is an ampholyte—a substance which can behave as an acid or a base—making it the universal solvent. This unique quality is most simply illustrated by the structural and destructural system of caverns. When water contains carbon dioxide, which combines with water to make carbonic acid, materials are dissolved. When carbon dioxide escapes water becomes a base and materials are precipitated as stalactites and stalagmites. Similar nonliving processes occur throughout the environment in cycles of deposition and reclamation.

Electrolytic processes can be utilized to selectively precipitate materials onto suitable surfaces. A certain electrical potential between electrodes will deposit negative ions on the anode and positive ions on the cathode. During the electrodeposition process, there are three methods by which material can potentially be accreted on the cathode:
1. concentration gradients,
2. ionic attraction, and
3. electric migration.

Figure 1:
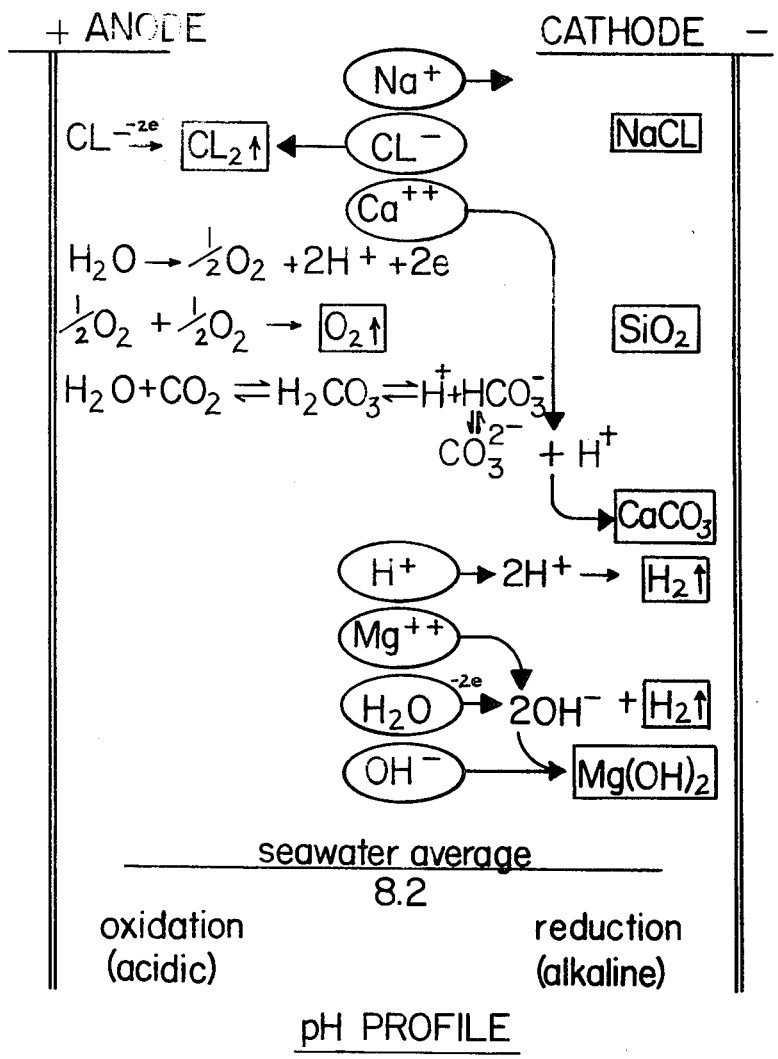
FIG. 1 depicts a theorectical qualitative model for the electrochemical processes involved in the accretion of minerals.

Although concentration gradients are most likely the cause of accretion, combinations of the three methods cannot be precluded. The basic model of the electrochemical reactions in a greatly simplified form is diagrammed in FIG. 1. In FIG. 1, the rectangular boxes represent either the mineral compounds precipitated from solution by the above methods, or the gases which are evolved. The arrows represent possible pathways of reactions according to the pH profile.

In addition to attracting ions, electrolysis of seawater produces heat at the electrode surfaces. The resistance is greatest at these surfaces; the temperature is therefore greater and the pH will rise. At first, the thermal decomposition removes the carbonic acid ($H_2CO_3$) allowing carbon dioxide ($CO_2$) to escape, which causes the hydrogen carbonatecarbonate equilibrium to shift to the carbonate side. The increased carbonate concentration, with increase in temperature and salinity, will increase the ionic product of calcium carbonate crystals, and induce precipitation. However, as the solution becomes more alkaline (at pH greater than 9), the ionic product of a brucite [$Mg(OH)_2$] will exceed the solubility product and brucite as well as the carbonates will be precipitated. The structural development in this case would be inhibited. It is also possible that amorphous matter enveloping the cathode, and the presence of other crystals such as phosphates, hydroxides, or sodium carbonate, inhibit the precipitation of calcium carbonate and prevent further growth of the crystals which do form.

It is evident from X-ray diffraction tests and chemical titration analysis that the greatest percentage of the material formed is brucite. It is found in two of its three distinct forms: the plate-like or foliate type, and massive material. Brucite, in its foliate form, is harder than talc or gypsum, and is not elastic; in its massive material form, it has a soapy appearance. It is possible that some small percentages of the composition consists of portlandite [$CA(OH)_2$], which is isostructural with brucite. Fast precipitation of compounds from seawater usually results in brucite of the massive material form; slow precipitation usually results in brucite of the foliate crystalline structure. A major factor in the association of $Mg^{2+}$ in the form of $Mg(OH)_2$ is the reduction of $CO_2$ pressure in the upper reaches of the ocean. If the $CO_2$ pressure is increased to normal, lowering the pH, $Mg(OH)_2$ would revert to $MgCO_3$. Furthermore, the $MgCO_3$ would crystalize into available nuclei—i.e. aragonite and calcite.

B. Electrodeposition of Minerals Onto Large Complex Surfaces as Structures, Architectural Components, and Elements To illustrate the use of mineral electrodeposition for the construction of large surface area structures, building components or elements of a hard, strong material of high strength, two examples involving large cathodic surfaces will be described. As used herein, "large surfaces" and "large surface area" are defined to be surfaces greater than 100 square feet. As used herein, the term "a hard, strong material of high strength" is defined to be a material having a compression strength of at least 1000 P.S.I. Also, as used herein, "nonstructural" means lacking the usual characteristics found suitable for use in building structures wherein reinforcement to resist against forces is required.

Figure 2:
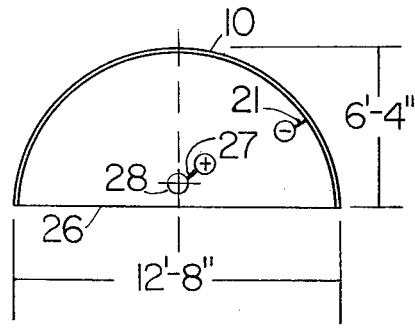
FIGS. 2 and 3 are drawings of a non-structural form used in the construction of a large surface area building component through the use of mineral electrodeposition.
Figure 3:
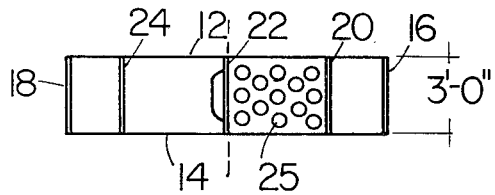

Referring first to FIGS. 2 and 3, there is shown in plan and elevation, respectively, a preshaped form 10, which is configured in a half-circle formation. Form 10 comprises a welded steel frame 11 having first and second longitudinal side members 12, 14; end member 16, 18; and intermediate transverse braces 20, 22, 24. The steel members which are welded together to form the frame are ⅜ inch steel. Form 10 further includes an outer layer of one-half inch wiremesh and an inner layer of one-half inch wiremesh, which are separated with sections of 8 inch O.D. PVC spacers 25. Form 10 is supported in its half-circle formation by a nylon tension rope 26 connected between end members 16 and 18. The dimensions of preshaped form 10 are: a radius of six feet-four inches, and a frame width of three feet, which provides a surface area of 158⅓ square feet. As will be appreciated, preshaped form 10 as a whole, though largely of electrically conductive material, is a nonstructural article.

To construct a building component of hard, strong material with preshaped form 10, it is disposed in a volume of electrolyte, such as seawater, and is used as a cathode. An electrical connection 21 is made to the form. An anode 28 is disposed in proximity to form 10. The anode may be iron, steel, lead, platinum, columbium, and for a form of the dimensions specified, the anode may be a sheet which is approximately seven and one-half inches by 24 inches. An anode connection 27 is provided. Electrical connections to the cathode and the anode are in turn connected to a DC electrical source producing a peak output of 200 watts to establish a direct electrical current between the electrodes. The source preferably supplies electrical current of approximately 30 amperes at 6 volts, which in this example yields a current density of approximately 189 mA/sq.ft. and an electric field potential between the electrodes of approximately 6 volts. After supplying electricity for 170 hours, accretion thickness in one experiment conducted on a form like that shown in FIGS. 2 and 3 measured 2.7 cm on the $\frac{3}{8}$ inch steel frame and 2.3 mm on the $\frac{1}{8}$ inch wire mesh.

Figure 5:
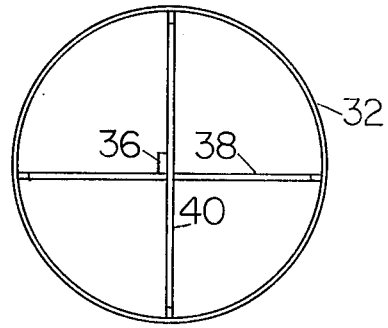
FIGS. 4 and 5 are drawings of another non-structural preshaped form used in the construction of a large surface area building component through the use of mineral electrodeposition.
Figure 4:
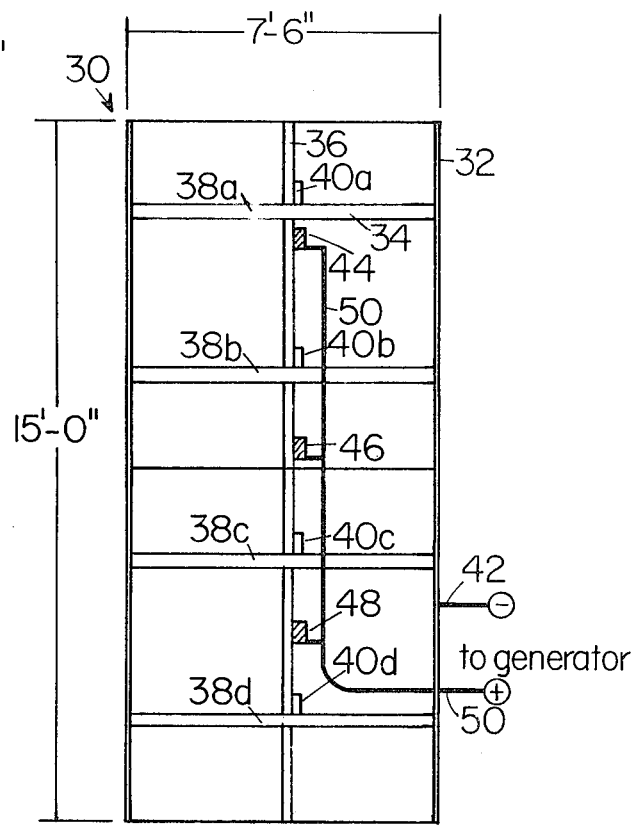

Referring now to FIGS. 4 and 5, there is illustrated a preshaped form 30 of a circular column or pipeline formation. This formation measures seven and one-half feet in diameter and 15 feet in height. Wall 32 construction is of one-half inch galvanized hardware cloth layed in inner and outer layers with approximately one inch spacing. Vertical elongated spacers of PVC material are utilized to maintain uniform spacing. In addition, a frame 34 of nailed two inch by six inch wooden members is disposed internally of column or pipeline 30. The wooden frame as shown in FIGS. 4 and 5 comprises a longitudinal member 36 and several cross-members arranged in mutually perpendicularly oriented pairs and at uniformly spaced locations along the longitudinal member. The wooden frame may be temporary and used only during the beginning phase of accretion. Again, form 30 is a nonstructural article.

A cathode connection 42 is made to wall 32. Disposed internally of column form 30 are three anodes 44, 46 and 48. Each of the anodes is connected to a common electrical conductor 50 which provides an anode electrical current supply line. Anodes 44, 46, 48 may be one-half inch by six inch by 12 inch lead blocks. The lead anodes are supported from the internal wooden frame to be at uniformly spaced vertical locations along the longitudinal axis of the column. Cathode and anode connections to a DC electrical power source may, for example, be insulated copper cables of AWG10, which are fastened with at the cathodic form and the anodes. The cable to electrode connections may be insulated with a suitable material like silicone. The electrical current source to form 30 for accretion may be a DC generator supplying 12 volts electrical power at a peak output of 200 watts. A suitable generator arrangement could be two WINCO Model 1222 generators.

The mechanical properties of electrodeposited minerals obtained on one-half inch galvanized hardware cloth indicate that the material has a compression strength of 3720–5350 P.S.I. For comparison, normal Portland cement Type 1 concrete has a compression rating of 3500 P.S.I., and is typically used for stairs and steps, sidewalks, driveways, slabs on grade, and basement wall construction.

The strength of the material will be affected by the rate of accretion. Fast accretion with a high current density gives lower strength; slower accretion with a lower current density yields a harder material. Strength may vary from 1000–8000 P.S.I. Usable current density may range up to 15000 milliamps (mA) per square foot with electric field potential between the electrodes of up to 30,000 volts.

In both of the foregoing examples, a totally electrolytic process is described. However, the large surface area structures may also be produced by "phasing" which is a variation of the basic accretion process.

"Phasing" as used herein refers to a process of accreting a structure in which electrodeposition (diagenesis) is first begun and continued through a first phase, and subsequently, during a second phase, the electrolytic process is discontinued and direct interaction of the deposited material with biological material (biogenesis) in the electrolyte proceeds, which may change the properties of the previously deposited material. After first and second phases, the process of forming the structure may be considered to be complete or electrodeposition may be resumed. If desired, diagenesis and biogenesis may be alternately repeated several times during the formation of a structure.

Another variation on the procedure followed in the foregoing examples is that of switching the polarity of the electrodes (i.e. the cathode becomes the anode and vice-versa). By switching polarity of the electrodes, the material on what originally was the cathode is altered and the original anode material is integrated into an accreted material. The polarity may again be switched to re-establish the original electrode polarities; in fact, switching of electrode polarity may be done a number of times to achieve a desired composition of accreted material.

C. Specific Engineering and Architectural Applications

The mineral accretion process potentially can contribute significantly to the solution of formidable engineering tasks which will be undertaken in the oceans, like the construction of Ocean Thermal Energy Conversion plants. It is evident, for example, that the use of traditional engineering materials like steel or fiber reinforced concrete, plastics, and tubular steel for the construction of OTEC systems cold water supply pipes will produce enormous costs because the system will have to be overdesigned in respect to unknown or only vaguely defined parameters.

Quite to the contrary, a relatively light aquadynamic cathodic tube configuration (FIG. 6) which permits assembly of the plant on-site, can be accreted selectively in order to effectively withstand changing and unpredictably occurring forces (e.g. changing current patterns).

In case of slowly or suddenly occurring damage to the wall section, the tube can be repaired by placing an anode in the vicinity of the damaged portion, thus facilitating, for instance, cementation of cracks, replacement of lost materials, and reinforcement of previously deposited mineral layers. The OTEC plant is moored and moves with prevailing currents (see FIG. 7).

Aside from converting ocean thermal energy into electricity, the plant can also produce chlorine, hydrogen, ammonia, Mg(OH)$_2$ (brucite) as a byproduct of the electrolysis process used to provide uplift of cold water in the deep water pipes (see FIG. 8).

Through the application of heat, brucite can be directly reduced to the mineral periclase (MgO). Thus, the plant may produce refractory magnesia at potentially competitive cost, a raw material for magnesium production. The Cl$_2$ gas, resulting from electrolysis, can also be utilized. While building a considerable but not yet calculated head, the upwelled water/gas mixture can drive turbines. The nutrient rich deep water can be utilized at the surface as a mariculture medium.

D. Advantages of Mineral Accretion Technology

Artifactual building methods, as used at the present, have built-in limits. Example: A concrete or steel element in seawater, once broken or decayed, is useless because it cannot meet its design specifications unless it is repaired. In most cases repair necessitates removal from the site and repositioning, thus incurring unreasonably high cost.

A structural component produced by electrodeposition of minerals, however, can be repaired or reconditioned in situ after failure. With renewed electrical power input the same conditions and resources which formed the element initially can be utilized again. This characteristic is not found in any commonly used construction method or material.

When, for instance, a reinforced concrete volume is cured and has left the form, its structural and formal characteristics can be altered only by major operations. Thus, strict limits concerning the element's adaptability to changing conditions are enforced.

Applications for the electrochemical accretion process can be seen readily: floating habitats and industrial islands using clay refuse, sand, gravel, or water as a construction material, stabilized by mineral accretion, settlements on banks, seamounts, and the continental shelf, mariculture facilities, underwater storage tanks, dams and jetties, pipelines, bridges, tunnels, airport runways, beach accretions, sea walls, current diverters, building components for use on land, artificial reefs, boat and barge hulls, marina facilities, atoll closures, gravity anchors, current energy converters, research and observation facilities, buoys, piers, protective coatings for wood pilings, etc.

The foregoing description of the invention has been directed to particular examples of the construction of large surface area building components of a hard, strong material of high structural integrity for purposes of explanation and illustration. It is to be understood, however, that many modifications and changes in both the product or article and process for making the same can be made in the implementation and utilization of the present invention without departing from its concept of using electrodeposited minerals as a structural material. For example, it is contemplated that preshaped forms made of solid, rather than mesh, material could be utilized. Also, it is contemplated that preshaped forms may be made with structural subcomponents, such as reinforcing steel bars. It is also to be understood that the present invention is for the formation of large structural articles and the formation of a hard, strong material to provide structural integrity to an element which is without sufficient structural integrity.

What is claimed is:

1. A method for constructing a large surface area building component, comprising the steps of:
   disposing a large surface area preshaped substrate form having inner and outer surfaces in a volume of electrolyte, said form serving as a cathode;
   disposing an anode in the electrolyte in proximity to the preshaped form; and
   establishing a direct electrical current between the cathode and the anode for a time sufficient for accreting a solid mass of high strength electrodeposited mineral material surrounding the form and covering the inner and outer surfaces to a desired thickness, such that the form becomes embedded within the accreted material.

2. The method of claim 1 wherein the electrical current density is 1–15000 mA/sq.ft.

3. The method of claim 1 wherein the electric field potential between the electrodes is 1–30,000 volts.

4. The method of claim 1 wherein the electrolyte is a mineral containing liquid.

5. The method of claim 1 wherein the preshaped form is at least partially of an electrically conductive material.

6. A large surface area building component of a hard, strong material made by:
   disposing a large surface area form shaped in the configuration desired for the large surface area building component and having inner and outer surfaces in a volume of electrolyte, said form serving as a cathode;
   disposing an anode in the electrolyte in proximity to the shaped form; and
   establishing a direct electrical current between the shaped cathodic form and the anode for a time sufficient to accrete a mass of electrodeposited mineral material that surrounds the shaped form and covers the inner and outer surfaces to a desired thickness such that the form becomes embedded therein.

7. The component of claim 6 wherein the form is at least partially an electrically conductive material.

8. A large surface area building component of a hard strong material made by:
   disposing a large surface area form of nonstructural material having inner and outer surfaces and shaped in the configuration desired for the large building component in a volume conductive and serving as a cathode;
   disposing an anode in the electrolyte in proximity to the shaped form; and
   establishing a direct electrical current between the electrodes for a time sufficient to accrete a solid mass of high strength electrodeposited mineral material covering the inner and outer surfaces to a desired thickness, the electrical current being of a density of 1–15,000 mA/sq.ft. with an electric field potential between the electrodes of 1–30,000 volts.

9. A method of constructing a large surface area building component, which comprises the step of accreting a hard, strong material on a preshaped form having inner and outer surfaces by electrodeposition of minerals, the accreted material covering the inner and outer surfaces to a desired thickness.

10. A method of constructing a large surface area building component, which comprises the step of covering a non-structural preshaped form having inner and outer surfaces with a hard, strong material through an electrodeposition process, the inner and outer surfaces of the form being covered to a desired thickness of the material.

11. A method of constructing a large surface area building component, which comprises the step of covering a non-structural preshaped form having inner and outer surfaces with a hard, strong material of high structural integrity made by:
   disposing the large surface area preshaped form in a volume of electrolyte, said form serving as a cathode;
   disposing an anode in the electrolyte in proximity to the preshaped form; and
   establishing a direct electrical current between the cathode and the anode for a time sufficient to accrete the solid covering of material on the inner and outer surfaces of the form.

12. A method of constructing a large surface area building component, comprising the steps of:

disposing a large surface area preshaped form having inner and outer surfaces in a volume of electrolyte, said form serving as a cathode;

disposing an anode in the electrolyte in proximity to the preshaped form;

establishing a direct electrical current between the cathode and the anode for a period of time sufficient to accrete a layer of high strength material on the inner and outer surfaces of the form;

discontinuing the electrical current between the cathode and anode for a period of time; and re-establishing direct electrical current between the cathode and anode.

13. The method of claim 12 wherein the steps of interrupting current between the cathode and anode and re-establishing a current between the cathode and anode is repeated a multiplicity of times until a solid covering of accreted material of desired thickness and composition is formed on the inner and outer surfaces of the large surface area preshaped form.

14. A method of constructing a large surface area building component, comprising the steps of:

disposing a large surface area preshaped form having inner and outer surfaces in a volume of electrolyte, said form serving as an electrode;

disposing a second electrode in the electrolyte in proximity to the preshaped form;

establishing a direct electrical current between the electrodes in one direction for a period of time;

switching the polarity of the electrical current between the electrodes to establish a direct electrical current between the electrodes in an opposite direction; and re-establishing the original polarity of direct electrical current between the electrodes, thereby accreting a solid mass of mineral of a desired thickness on the inner and outer surfaces of the form.

15. A method of constructing a large surface area building component, comprising steps:

disposing a large surface area preshaped form having inner and outer surfaces in a volume of electrolyte, said form serving as a cathode;

disposing an anode in the electrolyte in proximity to the preshaped form;

establishing a direct electrical current between the cathode and anode; and varying the electrical current density of the electrical current to accrete a solid covering of mineral material of a desired thickness and composition on the inner and outer surfaces of the form.

* * * * *

UNITED STATES PATENT OFFICE
CERTIFICATE OF CORRECTION

Patent No. 4,246,075      Dated January 20, 1981

Inventor(s) Wolf H. Hilbertz

It is certified that error appears in the above-identified patent and that said Letters Patent are hereby corrected as shown below:

(Col. 1 Line 19) - "Prentiss-Hall" should read

-- Prentice-Hall --.

(Col. 1, Line 20, first occurrence "in" should be deleted.

(Col. 2, Line 35) - "theorectical" should read

-- theoretical --.

(Col. 4, Line 13) - "[CA(OH)$_2$]" should read -- [Ca(OH)$_2$] --.

(Col. 4, Line 22) - "crystalize" should read

-- crystallize --.

(Col. 4, Line 65) - after "platinum," insert -- or --.

(Col. 5, Line 42) - delete "with at" and insert -- to --.

(Col. 5, Line 62) - "milliamps" should read -- millamperes --.

UNITED STATES PATENT OFFICE
CERTIFICATE OF CORRECTION

Patent No. 4,246,075　　　　　Dated January 20, 1981

Inventor(s)　Wolf H. Hilbertz

It is certified that error appears in the above-identified patent and that said Letters Patent are hereby corrected as shown below:

Claim 8 should read:

8. A large surface area building component of a hard strong material made by:

disposing a large surface area form of nonstructural material having inner and outer surfaces and shaped in the configuration desired for the large building component in a volume of electrolyte, the form being electrically conductive and serving as a cathode;

disposing an anode in the electrolyte in proximity to the shaped form; and establishing a direct electrical current between the electrodes for a time sufficient to accrete a solid mass of high strength electrodeposited mineral material covering the inner and outer surfaces to a desired thickness, the electrical current being of a density of 1-15,000 mA/sq.ft. with an electric field potential between the electrodes of 1-30,000 volts.

UNITED STATES PATENT OFFICE
CERTIFICATE OF CORRECTION

Patent No. 4,246,075  Dated January 20, 1981

Inventor(s) Wolf H. Hilbertz

It is certified that error appears in the above-identified patent and that said Letters Patent are hereby corrected as shown below:

(Col. 3, Line 59)  - "carbonatecarbonate"

should read --  carbonate-carbonate  --.

(Col. 4, Line 45)  - "member" should read

--  members  --.

Signed and Sealed this

Sixteenth Day of June 1981

[SEAL]

Attest:

RENE D. TEGTMEYER

*Attesting Officer*     *Acting Commissioner of Patents and Trademarks*